(12) United States Patent
Kang

(10) Patent No.: US 12,026,092 B2
(45) Date of Patent: Jul. 2, 2024

(54) DATA STORAGE DEVICE AND METHOD OF OPERATING THE SAME

(71) Applicant: SK hynix Inc., Gyeonggi-do (KR)

(72) Inventor: Hye Mi Kang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 40 days.

(21) Appl. No.: 17/849,194

(22) Filed: Jun. 24, 2022

(65) Prior Publication Data

US 2023/0205689 A1 Jun. 29, 2023

(30) Foreign Application Priority Data

Dec. 28, 2021 (KR) .......................... 10-2021-0189518

(51) Int. Cl.
*G06F 12/06* (2006.01)
*G06F 12/0817* (2016.01)

(52) U.S. Cl.
CPC ........ *G06F 12/0646* (2013.01); *G06F 12/082* (2013.01)

(58) Field of Classification Search
CPC ...... G06F 12/0646; G06F 12/06; G06F 12/08; G06F 12/0873; G06F 12/0824
See application file for complete search history.

(56) References Cited

U.S. PATENT DOCUMENTS

| 10,635,331 | B2 * | 4/2020 | Mulani | G06F 3/0655 |
| 11,291,591 | B1 * | 4/2022 | Gu | B33Y 80/00 |
| 2014/0047170 | A1 * | 2/2014 | Cohen | G06F 12/0246 711/103 |
| 2014/0297951 | A1 * | 10/2014 | Baptist | G06F 11/3485 711/114 |
| 2017/0061137 | A1 * | 3/2017 | Rabefarihy | G06F 21/755 |
| 2017/0228155 | A1 * | 8/2017 | Shirota | G06F 3/061 |
| 2019/0012099 | A1 * | 1/2019 | Mulani | G06F 3/0619 |
| 2019/0095132 | A1 * | 3/2019 | Tatsumi | G06F 3/0641 |
| 2019/0155723 | A1 * | 5/2019 | Park | G06F 12/0862 |

(Continued)

FOREIGN PATENT DOCUMENTS

| EP | 1550952 A2 * | 7/2005 | ......... G06F 12/0246 |
| KR | 10-1226600 B1 | 1/2013 | |
| KR | 10-2020-0116372 A | 10/2020 | |

OTHER PUBLICATIONS

J. Gandhi et al., "Range Translations for Fast Virtual Memory," in IEEE Micro, vol. 36, No. 3, pp. 118-126, May-Jun. 2016.*

*Primary Examiner* — Pierre Michel Bataille
(74) *Attorney, Agent, or Firm* — IP & T GROUP LLP

(57) ABSTRACT

A data storage device may include a storage and a controller. The storage a storage including a first region of a first physical address range and a second region of a second physical address range. The controller may generate map data including a plurality of map segments, a first segment entry and a second segment entry, and store, in the second region, the map data except for a first map segment. Each of the map segments includes a set of physical addresses corresponding to a plurality of sequential logical addresses. The first segment entry includes a first segment physical address associated with the first map segment and belonging to the first physical address range, and the second segment entry includes a second segment physical address associated with a second map segment and belonging to the second physical address range.

22 Claims, 10 Drawing Sheets

(56) References Cited

U.S. PATENT DOCUMENTS

2020/0151110 A1* 5/2020 Haswell .............. G06F 12/0246
2020/0327063 A1* 10/2020 Kang .................. G06F 12/0871
2022/0121379 A1* 4/2022 Byun ................... G06F 3/0638

* cited by examiner

FIG. 2

DATA STORAGE DEVICE AND METHOD OF OPERATING THE SAME

CROSS-REFERENCES TO RELATED APPLICATION

The present application claims priority under 35 U.S.C. § 119(a) to Korean patent application number 10-2021-0189518, filed on Dec. 28, 2021, which is incorporated herein by reference in its entirety.

BACKGROUND

1. Technical Field

Various embodiments of the present disclosure generally relate to a semiconductor integrated device, more particularly, to a data storage device and a method of operating the same.

2. Related Art

A data storage device may input and output data using a volatile memory device or a non-volatile memory device as a storage medium based on requests of a host device.

The data storage device may use various storage medium. For example, the data storage device may use the non-volatile memory device such as a flash memory device as the storage medium.

Map data, which may be required for accessing the storage medium by synchronizing the data storage device with the host device, may direct a mapping relation between a logical address used by the host device and a physical address used by the data storage device. The map data may be stored in the storage medium. The map data may be loaded into an operation memory used by a controller when the data storage device may be operated.

As a capacity of the storage medium may have been increased, a size of the map data may also be increased. Thus, the map data required for operating the controller may be partially loaded and used.

In order to load the map data into the controller or update changed map data in the storage medium, the map data may repeatedly access the storage medium to reduce a performance of the data storage device.

SUMMARY

According to embodiments of the present disclosure, there may be provided a data storage device. The data storage device may include a storage and a controller. The storage may include a first region of a first physical address range and a second region of a second physical address range. The controller may segment entry and a second segment entry, and store, in the second region, the map data except for a first map segment. Each of the map segments includes a set of physical addresses corresponding to a plurality of sequential logical addresses. The first segment entry includes a first segment physical address associated with the first map segment and belonging to the first physical address range, and the second segment entry includes a second segment physical address associated with a second map segment and belonging to the second physical address range.

According to embodiments of the present disclosure, there may be provided a data storage device. The data storage device may include a storage including a first region and a second region and a controller. The controller may generate a plurality of map segments and a segment entry, each map segment including a set of physical addresses corresponding to a plurality of sequential logical addresses and the segment entry including a segment physical address associated with a selected map segment, store, when the physical addresses in the selected map segment have sequential values, a first physical address that is a leading physical address of the physical addresses in the selected map segment as the segment physical address associated with the selected map segment, and store, in the second region, the map segments except for the selected map segment, which the segment physical address associated with is the first physical address.

According to embodiments of the present disclosure, there may be provided a method of operating a data storage device including a first region of a first physical address range and a second region of a second physical address range, the method comprising: generating a plurality of map segments each including a set of physical addresses corresponding to a plurality of sequential logical addresses; generating a first segment entry and a second segment entry, the first segment entry including a first segment physical address associated with a first map segment and belonging to the first physical address range and the second segment entry including a second segment physical address associated with a second map segment and belonging to the second physical address range; and storing, in the second region, map data except for the first map segment.

According to embodiments of the present disclosure, there may be provided a method of operating a controller comprising allotting first access-requested physical addresses, which are sequential, respectively corresponding to first access-requested logical addresses, which are sequential; and controlling a storage to store therein information including a pair of a segment identifier and a segment physical address, wherein the segment identifier is a representative one of sequential logical addresses, to which the first access-requested logical addresses belong, wherein the segment physical address is a physical address corresponding to the representative logical address among sequential physical addresses respectively corresponding to the sequential logical addresses, and wherein the storage is controlled to store therein the information other than the sequential logical and physical addresses.

BRIEF DESCRIPTION OF THE DRAWINGS

The above and another aspects, features and advantages of the subject matter of the present disclosure will be more clearly understood from the following detailed description taken in conjunction with the accompanying drawings, in which:

FIG. 2 is a view illustrating a structure of a data storage device based on embodiments of the present disclosure;

DETAILED DESCRIPTION

Various embodiments of the present disclosure will be described in greater detail with reference to the accompanying drawings. The drawings are schematic illustrations of various embodiments and intermediate structures. As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present invention as defined in the appended claims.

The present invention is described herein with reference to cross-section and/or plan illustrations of embodiments of the present invention. However, embodiments of the present invention should not be construed as limiting the inventive concept. Although a few embodiments of the present invention will be shown and described, it will be appreciated by those of ordinary skill in the art that changes may be made in these embodiments without departing from the principles and spirit of the present invention.

Figure 1:
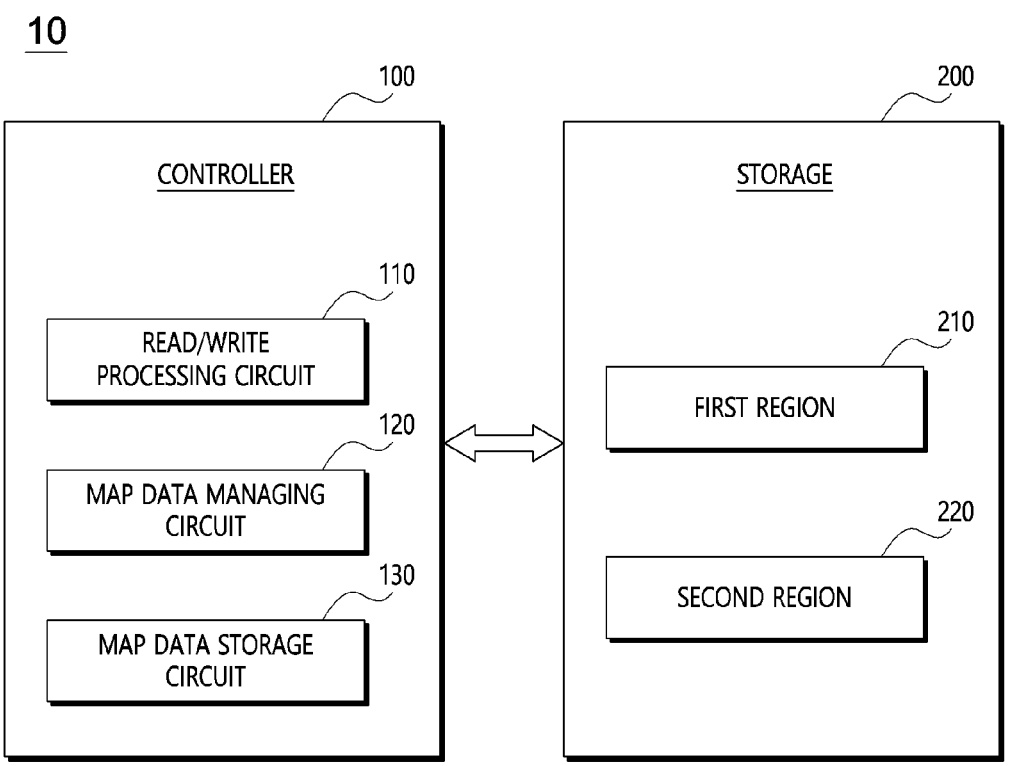
FIG. 1 is a view illustrating a data storage device based on embodiments of the present disclosure.

FIG. 1 is a view illustrating a data storage device 10 based on embodiments of the present disclosure.

Referring to FIG. 1, the data storage device 10 may include a controller 100 and a storage 200.

The controller 100 may control the storage 200 in response to a request of a host device. For example, the controller 100 may program data in the storage 200 based on a program (write) request of the host device. The controller 100 may provide the host device with the data in the storage 200 in response to a read request of the host device.

The controller 100 may include a hardware and a software configured to perform functions of a flash translation layer (FTL) including various functions for managing the storage 200, for example, a garbage collection, an address mapping, a wear leveling, etc.

The storage 200 may write the data or output written data under control of the controller 100. The storage 200 may include a volatile memory device or a non-volatile memory device. In various embodiments, the storage 200 may include an electrically erasable and programmable ROM (EEPROM), a NAND flash memory, a NOR flash memory, a phase-change RAM (PRAM), a resistive RAM (ReRAM), a ferroelectric RAM (FRAM), a spin torque transfer magnetic RAM (STT-MRAM), etc. The storage 200 may include a plurality of dies, a plurality of chips, a plurality of packages, etc. Memory cells in the storage 200 may include a single-level cell configured to store a bit of data in one memory cell, or a multi-level cell configured to store a plurality of bits of data in one memory cell.

The storage 200 may include a first region 210 and a second region 220. The first region 210 may be indicated by a first physical address range PA<0:L>. The first region 210 may correspond to a user data storage region. The second region 220 may be indicated by a second physical address range PA<M:N>. The second region 220 may correspond to a map data storage region.

In various embodiments, the controller 100 may include a read/write processing circuit 110, a map data managing circuit 120 and a map data storage circuit 130.

The read/write processing circuit 110 may transmit a program command including write data and physical addresses to the storage 200 by a write request of the host device including the write data and logical addresses to store the data in the storage 200. The read/write processing circuit 110 may transmit a read command including physical addresses to the storage 200 by a read request of the host device including logical addresses to obtain the data in the storage 200 and to provide the host device with the data.

The map data managing circuit 120 may convert the logical address transmitted by the host device into the physical address in the read request or the write request.

At least part of the map data for operating the data storage device 10 may be loaded into the map data storage circuit 130 from the storage 200. The map data generated or changed in operating the data storage device 10 may be temporarily stored in the map data storage circuit 130. The map data may then be updated in the storage 200.

The map data managing circuit 120 may generate a map segment. The map segment may include a set of sequential logical addresses and physical addresses corresponding to the logical addresses. The map data managing circuit 120 may generate a segment entry. The segment entry may include the map segment and a segment physical address related to the map segment. A segment physical address related to a map segment may indicate a physical location, in which the map segment is to be stored within the storage 200. The segment entry may be managed by a segment map table.

A pair of one logical address and a physical address corresponding to the logical address may be referred to as a map entry. The map segment may be a set of a set number of the map entries.

In a case of a sequential map segment having sequential physical addresses, the map data manger 120 may allot, as a segment physical address, a leading one of the sequential physical addresses included in the sequential map segment. The physical address included in the map segment may indicate a storage position of the user data within the first region 210 of the first physical address range. Thus, the sequential physical addresses including the leading physical address may also belong to the first physical address range indicating the first region 210. In this disclosure, a leading physical address of sequential physical addresses may be a physical address of a lowest value among the sequential physical addresses.

When the physical addresses in the map segment include a random map segment without the sequential values, the map data manger 120 may allot a second physical address selected within the second physical address range indicating the second region 220 of the storage 200.

When the map data may be stored in the storage 200, for example, an updating of the map may be performed, the map data managing circuit 120 may update the map data except for the map segment including the segment physical address within the first physical address range. The map segment including the segment physical address within the first physical address range is remained in the map data storage circuit 130.

When a map load may be operated to store the map data in the map data storage circuit 130 from the storage 200, the map data managing circuit 120 may load the segment map table into the map data managing circuit 130.

When an access-requested logical address is included in the sequential map segment, the map data managing circuit 120 may calculate an offset of the read-requested logical address or the write-requested logical address based on the leading logical address of the corresponding sequential map segment. The map data managing circuit 120 may apply the offset to the leading physical address of the corresponding sequential map segment to obtain the access-requested physical address. That is, the physical address in the sequential map segment may be searched by applying the offset from the segment physical address as the leading physical address. Thus, it may not be required to store all map segments in the storage 200.

According to various embodiments, the map data including the segment entry with respect to the sequential map segment, the random map segment and the segment entry with respect to the random map segment except for the sequential map segment may be stored in the storage 200 to reduce a storage space of the map data.

The segment entry, not all of the sequential map segment, may be loaded into the map data storage circuit 130 in the map load so that the map data storage circuit 130 may be effectively used.

Figure 2:
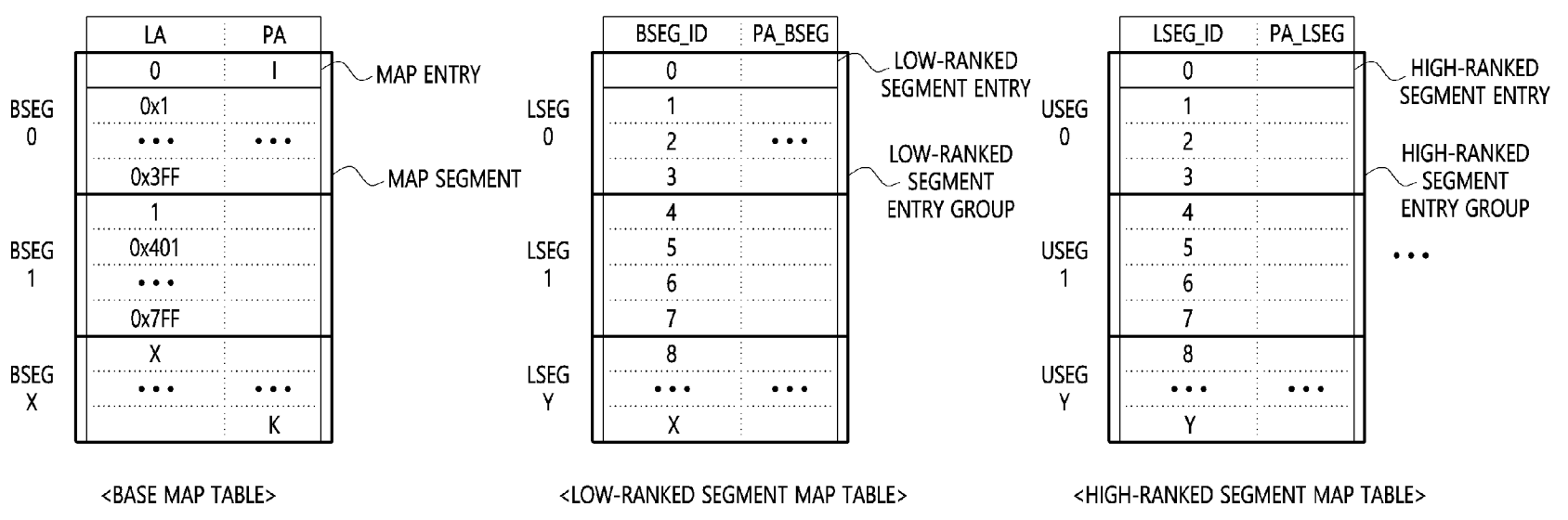

FIG. 2 is a view illustrating a structure of a data storage device based on embodiments of the present disclosure.

The map data managing circuit 120 may hierarchically manage the map data.

Referring to FIG. 2, the map data may include a base map table and a segment map table for managing physical addresses of the base map table.

The segment map table may also be hierarchically generated. For example, the segment map table may include a low-ranked segment map table for managing the physical address of the base map table and a high-ranked segment map table for managing a physical address of the low-ranked segment map table.

The base map table may include a plurality of map segments BSEG 0, BSEG 1, . . . , BSEG X. Each of the map segments BSEG 0, BSEG 1, . . . , BSEG X may include a plurality of map entries.

Each of the map entries may indicate a logical address LA used by the host device and a physical address PA corresponding to the logical address LA. The map segment may be a set of the logical addresses and the physical addresses corresponding to the logical addresses.

The host device may provide the sequentially increased logical addresses LA in the write operation to generate the map entries. Numbers of the map entries may be grouped to form the map segment.

The low-ranked map table may include a plurality of low-ranked segment entry groups LSEG 0, LSEG 1 and LESG Y. Each of the low-ranked segment entry groups LSEG 0, LSEG 1 and LESG Y may include a plurality of low-ranked segment entries. Each low-ranked segment entry may include a pair of a map segment identifier BSEG_ID and a segment physical address PA_BSEG corresponding to the map segment identifier BSEG_ID.

In various embodiments, the map segment identifier BSEG_ID may be a leading logical address in a corresponding map segment. In this case, the segment entry may include a pair of the leading logical address and a segment physical address corresponding to the leading logical address. In this disclosure, a leading logical address of sequential logical addresses may be a logical address of a lowest value among the sequential logical addresses.

In various embodiments, when the sequentially increased map segment identifiers BSEG_ID are assigned to the map segments, the map segment identifier BSEG_ID of a map segment to which the logical address LA transmitted by the host device belongs, may be obtained so that the segment physical address PA_BSEG corresponding to the map segment identifier BSEG_ID may be searched.

The high-ranked segment map table may include a plurality of high-ranked segment entry groups USEG 0, USEG 1 and UESG Y. Each of the high-ranked segment entry groups USEG 0, USEG 1 and UESG Y may include a plurality of high-ranked segment entries. Each high-ranked segment entry may include a pair of a low-ranked segment entry group identifier LSEG_ID and a corresponding low-ranked segment physical address PA_LSEG.

Hereinafter, for conveniences of description, the map data managing circuit 120 may generate and manage the base map table and one segment map table.

When a sequential map segment including sequential physical addresses may be generated, the map data managing circuit 120 may store, as the segment physical address PA_BSEG for the sequential map segment, a leading physical address of the sequential physical address in the segment map table. When a random map segment including non-sequential (i.e., random) physical addresses may be generated, the map data managing circuit 120 may allot a physical address indicating a storage location, into which the random map segment is to be stored within the storage 200. The allotted physical address may fall within the second physical address range indicating the second region 220. The map data managing circuit 120 may store the allotted physical address as the segment physical address PA_BSEG for the random map segment.

Figure 3:
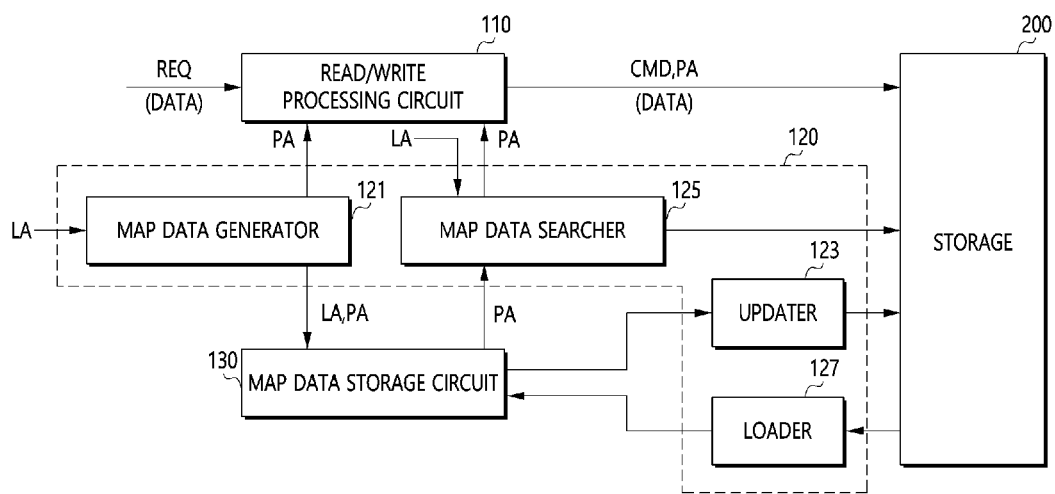
FIG. 3 is a view illustrating a map data management based on embodiments of the present disclosure.

FIG. 3 is a view illustrating a map data management based on embodiments of the present disclosure.

Referring to FIG. 3, the map data managing circuit 120 may include a map data generator 121, an updater 123, a map data searcher 125 and a loader 127.

When the host device transmits an access request REQ including a logical address LA, the access request REQ may be passed. The access request REQ may be transmitted to the read/write processing circuit 110. The logical address LA may be transmitted to the map data generator 121. When the access request REQ of the host device is the write request, write data DATA may be transmitted from the host device.

The map data generator 121 may map the physical address PA in response to the logical address LA provided with the write request. The map data generator 121 may generate the map segment and the map data including the segment map table associated with the map segment. The mapped physical address PA may be transmitted to the read/write processing circuit 110. The map data may be stored in the map data storage circuit 130.

The read/write processing circuit 110 may transmit a command, which may be generated by interpreting the request REQ of the host device and the physical address PA, which may be received from the map data generator 121, to the storage 200. The program command may be transmitted together with the write data DATA transmitted by the host device.

When the generated map segment is the sequential map segment, the map data generator 121 may store, as the segment physical address for the sequential map segment, the leading physical address of the sequential physical addresses included in the sequential map segment. Here, the leading physical address may fall within the first physical address range representing the first region 210. When the generated map segment is the random map segment, the map data generator 121 may allot a physical address indicating a storage location, into which the random map segment is to be stored within the storage 200. The allotted physical address may fall within the second physical address range indicating the second region 220. The map data generator 121 may store the allotted physical address as the segment physical address PA_BSEG for the random map segment.

The map data including the map segment and the segment entry may be stored in the map data storage circuit 130.

The updater 123 may store the map data stored in the map data storage circuit 130 in the storage 200. The updater 123 may be configured to omit an updating of the map segment corresponding to a segment entry including the segment physical address belonging to the first physical address range among the segment entries. Because the map segment corresponding to the segment entry including the segment physical address falling within the first physical address range indicating the first region 210, in which the user data may be stored, may be the sequential map segment, it may not be required to update the sequential map segment.

The map data searcher 125 may access the map data storage circuit 130 to search the read-requested physical address PA corresponding to the read-requested logical address LA provided together with the read request. The map data searcher 125 may provide the read/write processing circuit 110 with the read-requested physical address PA.

For example, the map data searcher 125 may detect the map segment identifier BSEG_ID corresponding to the read-requested logical address LA transmitted by the host device. The map data searcher 125 may search the segment map table loaded into the map data storage circuit 130 for the segment entry having the map segment identifier BSEG_ID corresponding to the read-requested logical address LA. When the segment map table has the hierarchical structure, the map data searcher 125 may search for the segment entry having the map segment identifier BSEG_ID corresponding to the read-requested logical address LA from the high-ranked segment map table to the low-ranked segment map table.

When the segment physical address PA_BSEG corresponding to the searched map segment identification BSEG_ID is included in the first physical address range, the map data searcher 125 may calculate the offset of the read-requested logical address LA based on the map segment identification BSEG_ID, i.e., the leading logical address. The map data searcher 125 may apply the offset to the segment physical address PA_BSEG, i.e., the leading physical address corresponding to the map segment identifier BSEG_ID or the leading logical address to obtain the read-requested physical address PA corresponding to the read-requested logical address LA.

When the segment physical address PA_BSEG corresponding to the searched map segment identifier BSEG_ID is included in the second physical address range and the corresponding mag segment may not be loaded into the map data storage circuit 130, the map data searcher 125 may provide the loader 127 with the segment physical address PA_BSEG corresponding to the searched map segment identifier BSEG_ID.

After the data storage device 10 is started, the loader 127 may load the whole segment map table into the map data storage circuit 130 from the storage 200.

When the segment physical address PA_BSEG corresponding to the searched map segment identifier BSEG_ID is provided from the map data searcher 125, the loader 127 may transmit the read command including the segment physical address to the storage 200 to obtain the map segment and to store the map segment in the map data storage circuit 130.

The map data searcher 125 may search the physical address PA from the map segment loaded into the map data storage circuit 130.

Figure 4:
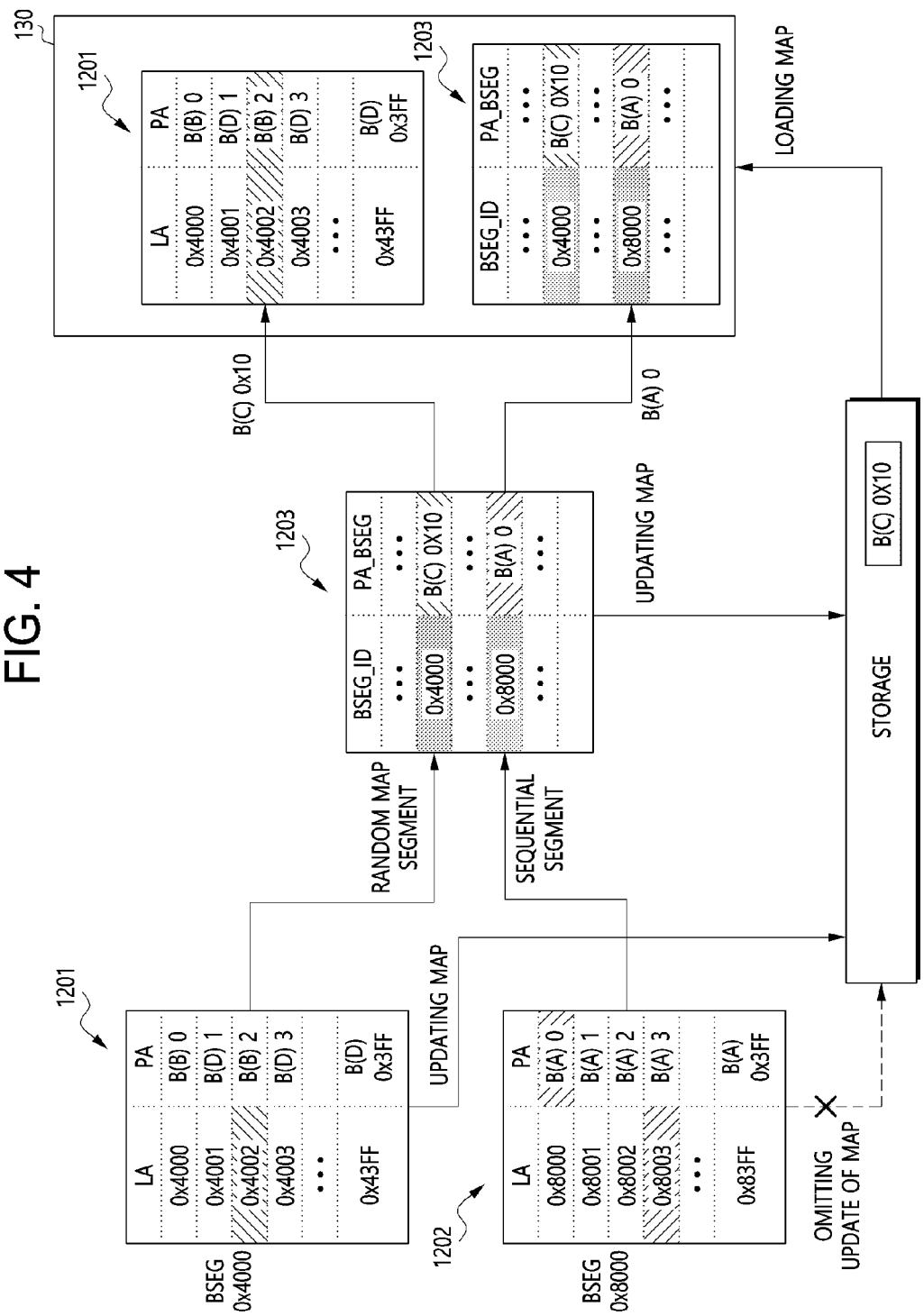
FIG. 4 is a view illustrating a process for managing map data based on embodiments of the present disclosure.

FIG. 4 is a view illustrating a process for managing map data based on embodiments of the present disclosure.

Referring to FIG. 4, the map data managing circuit 120 may generate a first map segment 1201 and a second map segment 1202 based on the write request of the host device.

The first map segment 1201 may be the random map segment in which the physical addresses PA corresponding to the logical addresses LA may be random.

The second map segment 1202 may be the sequential map segment in which the physical addresses PA corresponding to the logical addresses LA may be sequential.

The map data managing circuit 120 may designate the segment physical address PA_BSEG by different methods based on the sequential map segment and the random map segment to generate the segment map table 1203.

The map segment identifier BSEG_ID and the segment physical address PA_BSEG associated with the map segment identifier BSEG_ID may be stored in each of the entries of the segment map table 1203. It can be noted that a segment physical address PA_BSEG having a value of B(C) 0x10 with respect to a map segment identifier BSEG_ID having a value of 0x4000 for the first map segment 1201 may be stored and a segment physical address PA_BSEG having a value of B(A) 0 with respect to a segment physical address PA_BSEG having a value of 0x8000 for the second map segment 1202 may be stored.

The segment physical address PA_BSEG having the value of B(C) 0x10 may be a physical address within the second physical address range indicating the second region 220. The segment physical address PA_BSEG having the value of B(A) 0 may be a leading physical address of the physical addresses PA within the second map segment 1202.

The first map segment 1201, the second map segment 1202 and the segment map table 1203 may be temporarily stored in the map data storage circuit 130. The first map segment 1201 and the segment map table 1203 may then be updated in the storage 200.

When the map update may be required, the map data managing circuit 120 may store the random map segment 1201 and the segment map table 1203 in the storage 200. In contrast, the map data managing circuit 120 may not update the sequential map segment 1202.

When a read request to a logical address 0X4002 may be received, the map data managing circuit 120 may detect the map segment identifier BSEG_ID having the value of 0x4000 based on the logical address 0X4002. The map data managing circuit 120 may inquire the segment map table 1203 loaded into the map data storage circuit 130 to obtain the segment physical address PA_BSEG having a value of B(C) 0x10.

Because the obtained segment physical address B(C) 0x10 may be included within the second physical address range indicating the second region 220, when the first map segment 1201 is not loaded into the map data storage circuit 130, the map data managing circuit 120 may load the first map segment 1201 from the region indicated by the segment physical address PA_BSEG having a value of B(C) 0x10 within the storage 200.

The map data managing circuit 120 may read the first map segment 1201 from the position indicated by the segment physical address PA_BSEG having a value of B(C) 0x10 within the storage 200. The map data managing circuit 120 may load the read first map segment into the map data storage circuit 130 to obtain a physical address having a value of B(B) 2 and mapped to the logical address 0X4002.

When a read request to a logical address 0X8003 may be received, the map data managing circuit 120 may detect the map segment identifier BSEG_ID having the value of 0x8000 based on the logical address 0X8003. The map data managing circuit 120 may inquire the segment map table 1203 loaded into the map data storage circuit 130 to obtain the segment physical address PA_BSEG having a value of B(A) 0.

Because the obtained segment physical address PA_BSEG having a value of B(A) 0 may be included within the first physical address range indicating the first region 210, the map data managing circuit 120 may detect, based on the read-requested logical address 0X8003, a leading logical address 0X8000 (i.e., the map segment identifier BSEG_ID) from the segment map table 1203 loaded into the map data storage circuit 130. The map data managing circuit 120 may calculate an offset 3 of the read-requested logical address 0X8003 based on the leading logical address 0X8000 (i.e., the map segment identifier BSEG_ID). The map data managing circuit 120 may apply the offset 3 to the segment physical address PA_BSEG having the value B(A) 0 corresponding to the leading logical address 0X8000 (i.e., the map segment identifier BSEG_ID) to obtain a physical address B(A) 3 mapped to the read-requested logical address 0X8003.

Therefore, it may not be required to store all data of the sequential map segment in the storage 200 or load all data of the sequential map segment in the map data storage circuit 130 so that a cost for processing the map data may be reduced.

Figure 5:
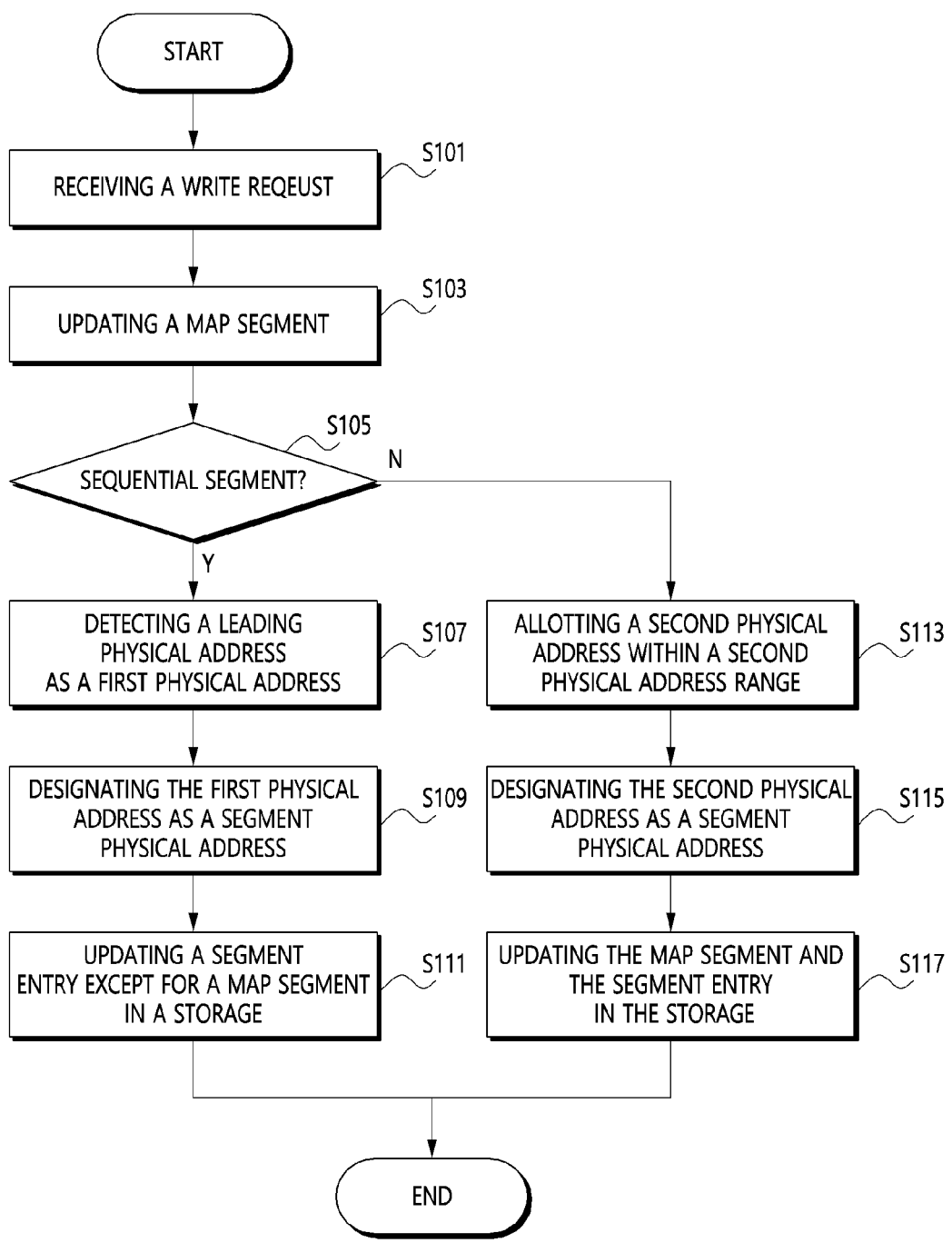
FIG. 5 is a flow chart illustrating a method of operating a data storage device based on embodiments of the present disclosure.

FIG. 5 is a flow chart illustrating a method of operating a data storage device based on embodiments of the present disclosure.

Referring to FIG. 5, in operation S101, the controller 100 may receive the write request including the logical address LA from the host device.

In operation S103, the controller 100 may map the physical address PA in response to the logical address LA and reflect in the map segment.

In operation S105, the controller 100 may identify the physical address in the updated map segment to determine whether the map segment is a sequential map segment including sequential physical addresses.

When the map segment is a sequential map segment including sequential physical addresses, in operation S107, the controller 100 may detect, as the first physical address, the leading sequential physical address within the sequential map segment.

In operation S109, the controller 100 may designate the first physical address as the segment physical address PA_BSEG for the sequential map segment to generate the segment entry for the sequential map segment.

In operation S111, the sequential map segment and the corresponding segment entry may be temporarily stored in the map data storage circuit 130. Then, except the sequential map segment itself, only the segment entry for the sequential map segment may be updated in the storage 200 in operation S111.

In contrast, when the map segment is a random map segment including random physical addresses, in operation S113, the controller 100 may allot a second physical address indicating a storage location, into which the random map segment is to be stored within the storage 200. The allotted physical address may fall within the second physical address range indicating the second region 220.

In operation S115, the controller 100 may designate the second physical address as the segment physical address PA_BSEG for the random map segment to generate the segment entry for the random map segment.

In operation S117, the random map segment and the map data including the corresponding segment entry may be temporarily stored in the map data storage circuit 130. Then, the random map segment and the segment entry may be updated in the storage 200 in operation S117.

As shown in operations S111 and S117, the sequential map segment having a segment physical address among the segment entries belongs to the first physical address range may not be updated. The remaining map data may be updated. Therefore, a frequency of accesses to the storage 200 may be reduced for update or load of the map data in the storage 200.

Figure 6:
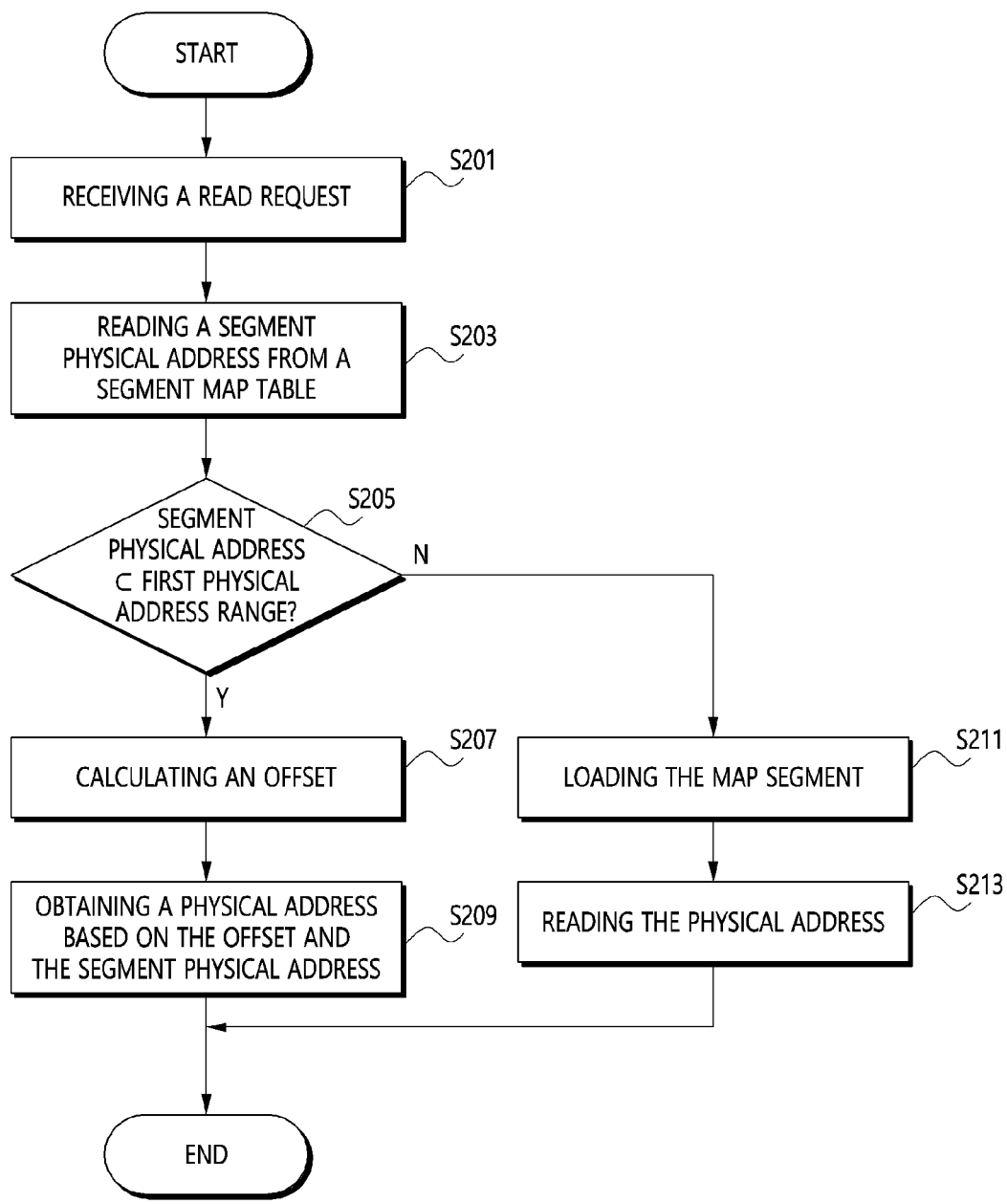
FIG. 6 is a flow chart illustrating a method of operating a data storage device based on embodiments of the present disclosure.

FIG. 6 is a flow chart illustrating a method of operating a data storage device based on embodiments of the present disclosure.

Referring to FIG. 6, in operation S201, the controller 100 may receive the read request including the logical address from the host device.

In operation S203, the controller 100 may search the segment map table for the segment physical address for a map segment, to which the read-requested logical address belongs. For example, the controller 100 may detect the map segment identifier BSEG_ID of the map segment including the read-requested logical address. The controller 100 may search the segment physical address PA_BSEG corresponding to the detected map segment identifier BSEG_ID from the segment map table loaded into the map data storage circuit 130.

In operation S205, the controller 100 may identify whether the searched segment physical address PA_BSEG may belong to the first physical address range or not.

When the searched segment physical address PA_BSEG may be within the first physical address range, in operation S207, the controller 100 may calculate the offset of the read-requested logical address based on the leading logical address or the detected map segment identifier BSEG_ID.

In operation S209, the controller 100 may apply the offset to the leading physical address or the searched segment physical address PA_BSEG, which corresponds to the detected map segment identifier BSEG_ID, to obtain the read-requested physical address corresponding to the read-requested logical address.

In contrast, when the searched segment physical address PA_BSEG is not within the first physical address range and the corresponding map segment is not loaded into the map data storage circuit 130, in operation S211, the controller 100 may transmit the read command including the searched segment physical address PA_BSEG to the storage 200 to obtain the map segment, which is the random map segment. The random map segment may then be stored in the map data storage circuit 130.

In operation S213, the controller 100 may read the physical address corresponding to the read-requested logical address from the random map segment loaded into the map data storage circuit 130.

Therefore, because the sequential map segment may not be updated in the storage 200, it may not be required to load the map segment into the map data storage circuit 130 from the storage 200. On the other hand, the read-requested physical address corresponding to the read-requested logical address may be readily obtained by applying the offset to the leading physical address or the segment physical address PA_BSEG, which corresponds to the map segment identifier BSEG_ID that can be identified by the read-requested logical address, the offset being obtained from the map segment identifier BSEG_ID and the read-requested logical address.

Figure 7:
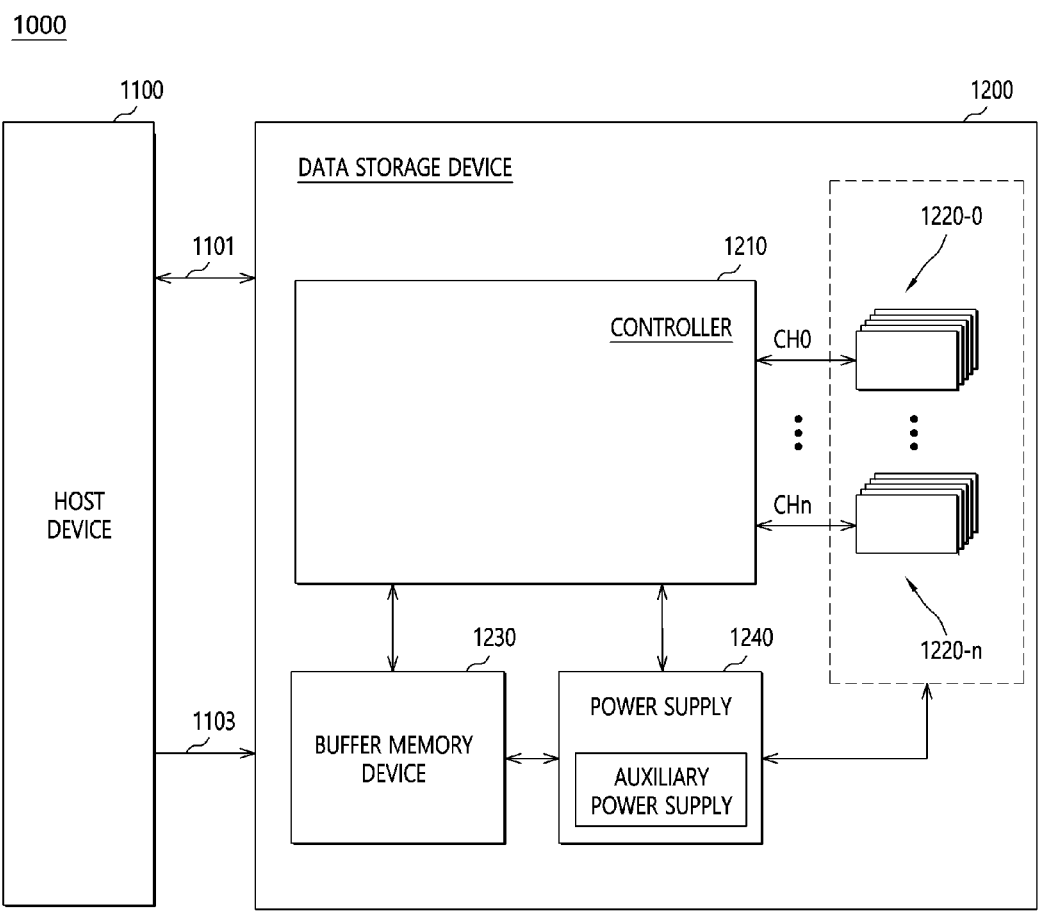
FIG. 7 is a diagram illustrating a data storage system in accordance with an embodiment of the present disclosure.

FIG. 7 is a diagram illustrating a data storage system 1000, in accordance with an embodiment of the present disclosure.

Referring to FIG. 7, the data storage 1000 may include a host device 1100 and the data storage device 1200. In an embodiment, the data storage device 1200 may be configured as a solid state drive (SSD).

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operations of the data storage device 1200. The controller 1210 may include a host interface unit, a control unit, a random access memory used as a working memory, an error correction code (ECC) unit, and a memory interface unit. In an embodiment, the controller 1210 may be configured as controller 110 shown in FIGS. 1 and 2.

The host device 1100 may exchange a signal with the data storage device 1200 through the signal connector 1101. The signal may include a command, an address, data, and so forth.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-n. Further, the buffer memory device 1230 may temporarily store the data read from at least one of the nonvolatile memory devices 1220-0 to 1220-n. The data temporarily stored in the buffer memory device 1230 may be transmitted to the host device 1100 or at least one of the nonvolatile memory devices 1220-0 to 1220-n according to control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH0 to CHn, respectively. One or more nonvolatile memory devices may be coupled to one channel. The nonvolatile memory devices coupled to each channel may be coupled to the same signal bus and data bus.

The power supply 1240 may provide power inputted through the power connector 1103 to the controller 1210, the nonvolatile memory devices 1220-0 to 1220-n and the buffer memory device 1230 of the data storage device 1200. The power supply 1240 may include an auxiliary power supply. The auxiliary power supply may supply power to allow the data storage device 1200 to be normally terminated when a sudden power interruption occurs. The auxiliary power supply may include bulk-capacity capacitors sufficient to store the needed charge.

The signal connector 1101 may be configured as one or more of various types of connectors depending on an interface scheme between the host device 1100 and the data storage device 1200.

The power connector 1103 may be configured as one or more of various types of connectors depending on a power supply scheme of the host device 1100.

Figure 8:
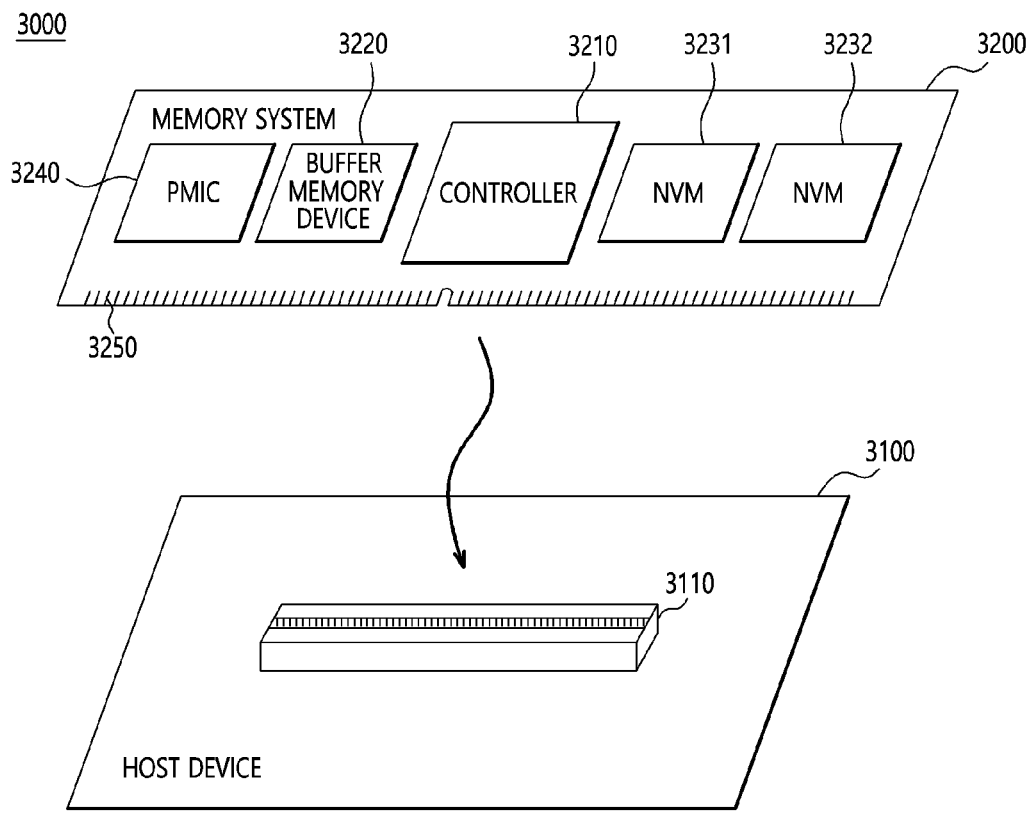
FIG. 8 and FIG. 9 are diagrams illustrating a data processing system in accordance with an embodiment of the present disclosure.

FIG. 8 is a diagram illustrating a data processing system 3000, in accordance with an embodiment of the present disclosure. Referring to FIG. 8, the data processing system 3000 may include a host device 3100 and a memory system 3200.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 110 shown in FIGS. 1 and 2.

The buffer memory device 3220 may temporarily store data in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250 to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data, and so forth, and power may be transferred between the host device 3100 and the memory system 3200. The connection terminal 3250 may be configured as one or more of various types depending on an interface scheme between the host device 3100 and the memory system 3200. The connection terminal 3250 may be disposed on a side of the memory system 3200, as shown.

Figure 9:
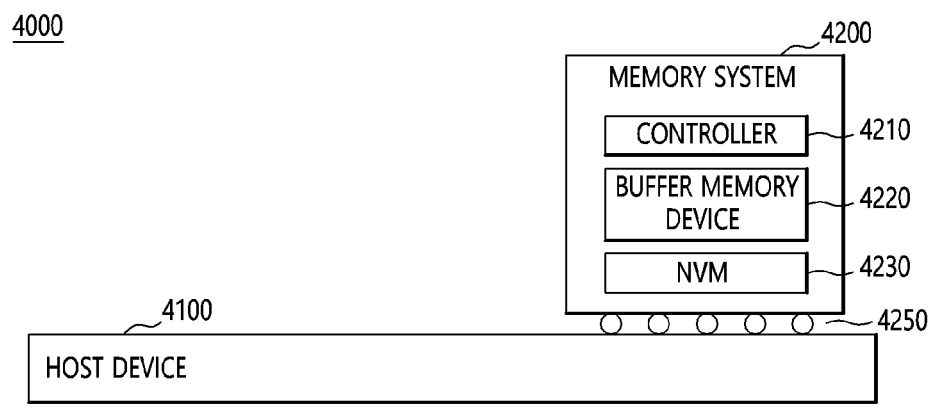

FIG. 9 is a diagram illustrating a data processing system 4000 in accordance with an embodiment of the present disclosure. Referring to FIG. 9, the data processing system 4000 may include a host device 4100 and a memory system 4200.

The host device 4100 may be configured in the form of a board, such as a printed circuit board. Although not shown, the host device 4100 may include internal function blocks for performing the function of a host device.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 shown in FIGS. 1 and 2.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 10:
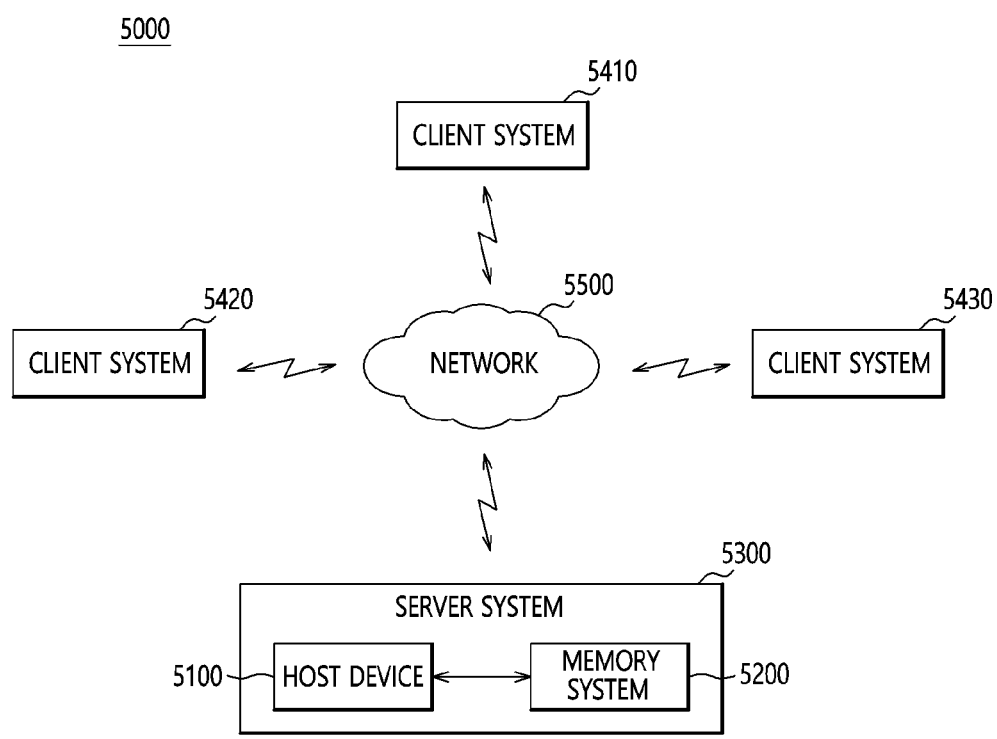
FIG. 10 is a diagram illustrating a network system including a data storage device in accordance with an embodiment of the present disclosure.

FIG. 10 is a diagram illustrating a network system 5000 including a data storage device, in accordance with an embodiment of the present disclosure. Referring to FIG. 10, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200. The memory system 5200 may be configured as the data storage apparatus 10 shown in FIG. 1, the data storage device 1200 shown in FIG. 7, the memory system 3200 shown in FIG. 8, or the memory system 4200 shown in FIG. 9.

Figure 11:
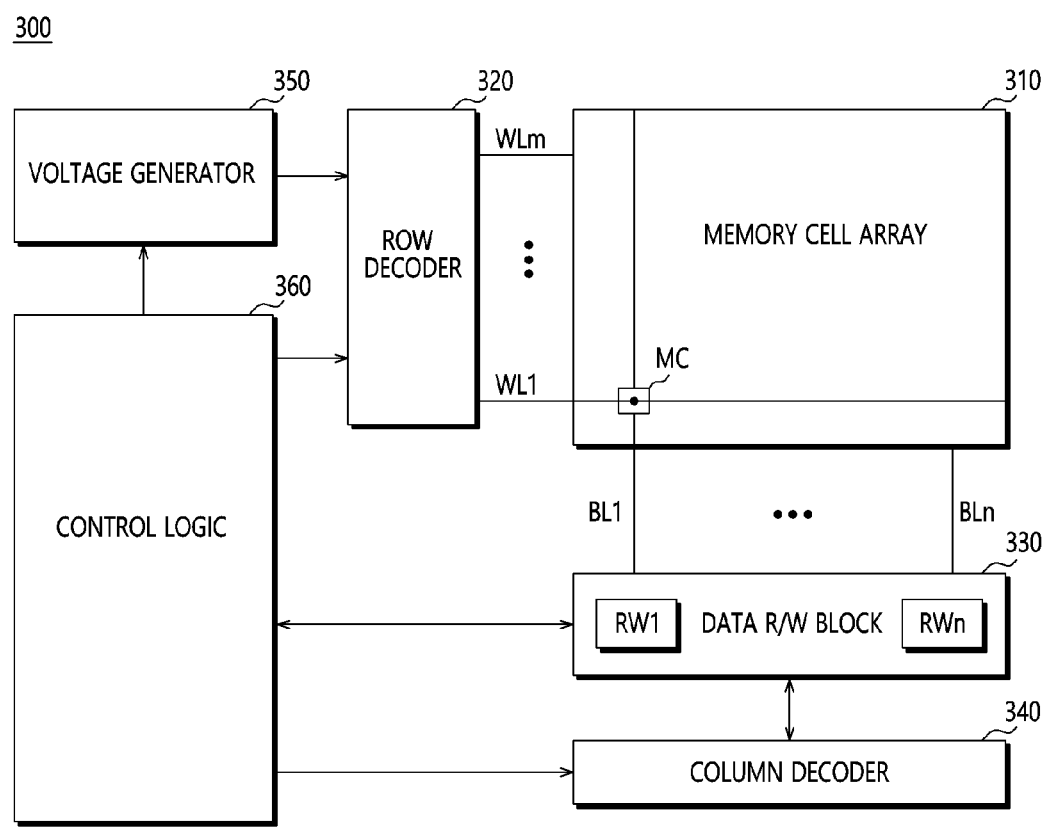
FIG. 11 is a block diagram illustrating a nonvolatile memory device included in a data storage device in accordance with an embodiment of the present disclosure.

FIG. 11 is a block diagram illustrating a nonvolatile memory device 300 included in a data storage device, such as the data storage device 10, in accordance with an embodiment of the present disclosure. Referring to FIG. 11, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The memory cell array 310 may comprise a three-dimensional memory array. The three-dimensional memory array, for example, has a stacked structure in perpendicular direction to the flat surface of a semiconductor substrate. Moreover, the three-dimensional memory array means a structure including NAND strings which memory cells comprised in NAND strings are stacked perpendicular to the flat surface of a semiconductor substrate.

The structure of the three-dimensional memory array is not limited to the embodiment indicated above. The memory array structure can be formed in a highly integrated manner with horizontal directionality as well as vertical directionality. In an embodiment, in the NAND strings of the three-dimensional memory array, memory cells are arranged in the horizontal and vertical directions with respect to the surface of the semiconductor substrate. The memory cells may be variously spaced to provide different degrees of integration.

The row decoder 320 may be coupled with the memory cell array 310 through the word lines WL1 to WLm. The row decoder 320 may operate according to control of the control logic 360. The row decoder 320 may decode an address provided by an external device (not shown). The row decoder 320 may select and drive the word lines WL1 to WLm, based on a decoding result. For instance, the row decoder 320 may provide a word line voltage, provided by the voltage generator 350, to the word lines WL1 to WLm.

The data read/write block 330 may be coupled with the memory cell array 310 through the bit lines BL1 to BLn. The data read/write block 330 may include read/write circuits RW1 to RWn, respectively, corresponding to the bit lines BL1 to BLn. The data read/write block 330 may operate according to control of the control logic 360. The data read/write block 330 may operate as a write driver or a sense amplifier, according to an operation mode. For example, the data read/write block 330 may operate as a write driver, which stores data provided by the external device in the memory cell array 310 in a write operation. For another example, the data read/write block 330 may operate as a sense amplifier, which reads out data from the memory cell array 310 in a read operation.

The column decoder 340 may operate according to control of the control logic 360. The column decoder 340 may decode an address provided by the external device. The column decoder 340 may couple the read/write circuits RW1 to RWn of the data read/write block 330, respectively corresponding to the bit lines BL1 to BLn, with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided by the external device. For example, the control logic 360 may control operations of the nonvolatile memory device 300 such as read, write, and erase operations of the nonvolatile memory device 300.

The above described embodiments of the present invention are intended to illustrate and not to limit the present invention. Various alternatives and equivalents are possible. The invention is not limited by the embodiments described herein. Nor is the invention limited to any specific type of semiconductor device. Additions, subtractions, or modifications which are apparent in view of the present disclosure, are intended to fall within the scope of the appended claims. Furthermore, the embodiments may be combined to form additional embodiments.

What is claimed is:

1. A data storage device comprising:
a storage including a first region of a first physical address range and a second region of a second physical address range; and
a controller configured to:
generate map data including a plurality of map segments, a first segment entry and a second segment entry, and store, in the second region, the map data except for a first map segment,
wherein each of the map segments includes a set of physical addresses corresponding to a plurality of sequential logical addresses, wherein the first segment entry includes a first segment physical address associated with the first map segment and belonging to the first physical address range, wherein the second segment entry includes a second segment physical address associated with a second map segment and belonging to the second physical address range, wherein the second region is a map data storage region, and wherein the physical addresses in the first map segment have sequential values.

2. The data storage device of claim 1, wherein the first region is a user data storage region.

3. The data storage device of claim 1, wherein the second physical address range is independent upon the first physical address range.

4. The data storage device of claim 1, wherein the controller is further configured to designate, as the first segment physical address, a leading physical address of the physical addresses in the first map segment.

5. The data storage device of claim 1, wherein the controller is further configured to designate, as the second segment physical address, a physical address within the second physical address range for storing the second segment entry.

6. The data storage device of claim 1, wherein the controller is further configured to load a segment map table including the first and second segment entries and the second map segment from the second region into the controller.

7. The data storage device of claim 1, wherein the controller is further configured to manage, as a unit segment entry for a map segment, a pair of a leading logical address among plural logical addresses included in the map segment and a segment physical address associated with the leading logical address.

8. The data storage device of claim 7, wherein, when a read-requested logical address is included in the first map segment, the controller is further configured to:

calculate an offset between the read-requested logical address and the leading logical address of the first map segment, and apply the offset to the segment physical address corresponding to the leading logical address of the first map segment, to obtain a physical address mapped with the read-requested logical address.

9. The data storage device of claim 1, wherein, when a read-requested logical address is included in the second map segment, the controller is further configured to read the second map segment at a position directed by the second segment physical address in the second region to obtain a physical address mapped with the read-requested logical address.

10. A data storage device comprising:

a storage including a first region and a second region; and a controller configured to:

generate a plurality of map segments and a segment entry, each map segment including a set of physical addresses corresponding to a plurality of sequential logical addresses and the segment entry including a segment physical address associated with a selected map segment, store, when the physical addresses in the selected map segment have sequential values, a first physical address that is a leading physical address of the physical addresses in the selected map segment as the segment physical address associated with the selected map segment, and store, in the second region, the map segments except for the selected map segment, which the segment physical address associated with is the first physical address, wherein the second region is a map data storage region, and wherein the physical addresses in the selected map segment have sequential values.

11. The data storage device of claim 10, wherein the first physical address is included in a first physical address range indicating the first region.

12. The data storage device of claim 10, wherein the controller is further configured to:

store, when the physical addresses in the selected map segment do not have sequential values, a second physical address selected from physical addresses indicating the second region as the segment physical address associated with the selected map segment, and store, in the second region, the selected map segment, which the segment physical address associated with is the second physical address.

13. The data storage device of claim 10, wherein the controller is further configured to manage, as a unit segment entry for a map segment, a pair of a leading logical addresses among plural logical addresses included in the map segment and a segment physical address associated with the leading logical addresses.

14. A method of operating a data storage device including a first region of a first physical address range and a second region of a second physical address range, the method comprising:

generating a plurality of map segments each including a set of physical addresses corresponding to a plurality of sequential logical addresses;

generating a first segment entry and a second segment entry, the first segment entry including a first segment physical address associated with a first map segment and belonging to the first physical address range and the second segment entry including a second segment physical address associated with a second map segment and belonging to the second physical address range; and storing, in the second region, map data except for the first map segment, wherein the second region is a map data storage region, and wherein the physical addresses in the selected map segment have sequential values.

15. The method of claim 14, wherein the controller controls the second physical address range independently of the first physical address range.

16. The method of claim 14, wherein the physical addresses in the first map segment have sequential values.

17. The method of claim 14, further comprising designating, as the first segment physical address, a leading physical address of the physical addresses in the first map segment.

18. The method of claim 14, further comprising designating, as the second segment physical address, a physical address within the second physical address range for storing the second segment entry.

19. The method of claim 14, further comprising loading a segment map table including the first and second segment entries and the second map segment from the second region into the controller.

20. The method of claim 14, further comprising storing, as a unit segment entry for a map segment, a pair of a leading logical addresses among plural logical addresses included in the map segment and a segment physical address associated with the leading logical addresses.

21. The method of claim 20, further comprising:
- calculating an offset between a read-requested logical address and the leading logical address of the first map segment, when the read-requested logical address is included in the first map segment; and
- applying the offset to the segment physical address corresponding to the leading logical address of the first map segment, to obtain a physical address mapped with the read-requested logical address.

22. The method of claim 14, further comprising:
- reading the second map segment at a position indicated by the second segment physical address in the second region when a read-requested logical address is included in the second map segment; and
- obtaining a physical address mapped with the read-requested logical address from the read second map segment.

* * * * *